United States Patent
Kim et al.

(10) Patent No.: US 11,065,605 B2
(45) Date of Patent: Jul. 20, 2021

(54) METHOD OF PREPARING A MULTI-COMPONENT ALLOY CATALYST

(71) Applicants: HYUNDAI MOTOR COMPANY, Seoul (KR); KIA MOTORS CORPORATION, Seoul (KR)

(72) Inventors: Jun Tae Kim, Yongin-si (KR); Ju Ahn Park, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 127 days.

(21) Appl. No.: 16/572,033

(22) Filed: Sep. 16, 2019

(65) Prior Publication Data

US 2020/0316567 A1    Oct. 8, 2020

(30) Foreign Application Priority Data

Apr. 2, 2019    (KR) .................. 10-2019-0038701

(51) Int. Cl.
B01J 23/42      (2006.01)
B01J 23/72      (2006.01)
(Continued)

(52) U.S. Cl.
CPC ........... B01J 23/42 (2013.01); B01J 23/6522 (2013.01); B01J 23/6562 (2013.01); B01J 23/72 (2013.01); B01J 23/75 (2013.01); B01J 23/755 (2013.01); B01J 37/0018 (2013.01); B01J 37/0236 (2013.01); B01J 37/06 (2013.01); C22C 5/04 (2013.01); C22C 9/05 (2013.01); C22C 9/06 (2013.01); C22C 19/00 (2013.01);
(Continued)

(58) Field of Classification Search
CPC .... B01J 23/42; B01J 23/6522; B01J 23/6562; B01J 23/72; B01J 23/75; B01J 23/755; B01J 37/0018; B01J 37/0236; B01J 37/06; H01M 8/1004; C22C 5/04; C22C 9/05; C22C 9/06; C22C 19/00; C22C 19/002; C22C 19/005; C22C 19/05; C22C 19/07
USPC ........ 502/101, 182, 185, 416; 429/524, 527, 429/483; 420/466, 485, 487, 493, 496, 420/497; 428/403, 457
See application file for complete search history.

(56) References Cited

U.S. PATENT DOCUMENTS 4,568,442 A * 2/1986 Goldsmith .......... H01M 4/8885
                                                    204/284
4,897,309 A * 1/1990 Haas ....................... B01J 20/20
                                                    427/214

(Continued)

FOREIGN PATENT DOCUMENTS

KR   2007 0055119   *  5/2007   ............. H01M 4/86
KR   2009 0090671   *  8/2009   ............. B01J 21/18
(Continued)

*Primary Examiner* — Patricia L. Hailey
(74) *Attorney, Agent, or Firm* — Lempia Summerfield Katz LLC

(57) ABSTRACT

A method for preparing a multi-component alloy catalyst on which a catalytic metal is supported includes preparing a carbon composite having a carbon support coated with a cationic polymer, supporting a catalytic metal containing at least two metal elements on the carbon composite to prepare an alloy catalyst precursor, and washing the alloy catalyst precursor to remove the cationic polymer.

11 Claims, 14 Drawing Sheets

(51) Int. Cl.
  *B01J 23/755* (2006.01)
  *B01J 23/75* (2006.01)
  *B01J 23/652* (2006.01)
  *B01J 37/00* (2006.01)
  *B01J 37/02* (2006.01)
  *B01J 23/656* (2006.01)
  *B01J 37/06* (2006.01)
  *C22C 19/00* (2006.01)
  *C22C 9/05* (2006.01)
  *C22C 19/07* (2006.01)
  *C22C 9/06* (2006.01)
  *C22C 19/05* (2006.01)
  *C22C 5/04* (2006.01)
  *H01M 8/1004* (2016.01)

(52) U.S. Cl.
  CPC .......... *C22C 19/002* (2013.01); *C22C 19/005* (2013.01); *C22C 19/05* (2013.01); *C22C 19/07* (2013.01); *H01M 8/1004* (2013.01)

(56) References Cited

U.S. PATENT DOCUMENTS

| | | | | |
|---|---|---|---|---|
| 5,314,760 A * | 5/1994 | Tsou | ............... | H01M 4/8668 429/525 |
| 5,876,867 A * | 3/1999 | Itoh | ............... | B01J 23/89 429/524 |
| 6,610,628 B2 * | 8/2003 | Nordquist | ............... | B01J 21/18 502/159 |
| 7,125,822 B2 * | 10/2006 | Nakano | ............... | H01M 4/8605 502/339 |
| 7,151,069 B2 * | 12/2006 | Yasunaga | ............... | H01M 4/921 502/101 |
| 7,771,860 B2 * | 8/2010 | Son | ............... | H01M 4/92 429/524 |
| 8,338,051 B2 * | 12/2012 | Takahashi | ............... | H01M 4/921 429/482 |
| 8,586,263 B2 * | 11/2013 | Son | ............... | H01M 4/90 429/523 |
| 10,038,200 B2 * | 7/2018 | Kim | ............... | H01M 4/8825 |
| 2009/0136816 A1 * | 5/2009 | Kang | ............... | C01B 32/00 429/502 |
| 2009/0246601 A1 * | 10/2009 | Iwata | ............... | H01M 4/9075 429/405 |
| 2010/0234210 A1 * | 9/2010 | Kawamura | ............... | H01M 4/92 502/101 |
| 2011/0081595 A1 * | 4/2011 | Ueno | ............... | H01M 4/921 429/482 |
| 2011/0244363 A1 * | 10/2011 | Min | ............... | H01M 4/92 429/483 |
| 2015/0099207 A1 * | 4/2015 | Yamaguchi | ............... | H01M 4/928 429/480 |
| 2018/0166698 A1 * | 6/2018 | Kim | ............... | H01M 4/9083 |
| 2018/0375108 A1 * | 12/2018 | Cho | ............... | H01M 4/9041 |
| 2020/0328430 A1 * | 10/2020 | Cho | ............... | C08J 5/2256 |

FOREIGN PATENT DOCUMENTS

| | | | | |
|---|---|---|---|---|
| KR | 20090090671 A | | 8/2009 | |
| KR | 2012 0057432 | * | 6/2012 | ............. B01J 23/89 |
| KR | 2015 0105742 | * | 9/2015 | ............. B01J 23/42 |
| WO | WO 2007/061248 | * | 5/2007 | ............. H01M 4/86 |

* cited by examiner

METHOD OF PREPARING A MULTI-COMPONENT ALLOY CATALYST

CROSS-REFERENCE TO RELATED APPLICATION

This application claims, under 35 U.S.C. § 119(a), the benefit of priority to Korean Patent Application No. 10-2019-0038701, filed on Apr. 2, 2019, the entire contents of which are incorporated herein by reference.

BACKGROUND

Technical Field

The present disclosure relates to a method for preparing a multi-component alloy catalyst on which a catalytic metal is supported.

Background Art

Research has been conducted on nano-sized metal particles in a variety of technical fields over the past several decades due to the unique properties thereof. In particular, platinum has been utilized in various catalytic reactions including fuel cells due to the excellent surface activity thereof, but the use of platinum is limited due to high prices and limited remaining discoverable reserves.

Therefore, a catalyst containing a reduced amount of platinum has been needed in order to solve the above problems. In an attempt to achieve this, a platinum-based multi-component alloy catalyst containing an alloy of platinum and a transition metal has been developed, making it possible to reduce platinum content. However, such a catalyst is synthesized in a complicated process and it is difficult to support a catalytic metal in an amount equivalent to a commercially available platinum catalyst, imposing limitations on catalyst performance and durability.

Moreover, a platinum catalyst must be subjected to a complicated process in which conditions such as pH are controlled for a long time in order to increase the amount of the metal supported thereon. In the case of an alloy catalyst containing three or more components, a synthesis process thereof is more complicated and a catalyst supporting a metal in a low amount of 20% to 40 wt % has been synthesized and used because it is difficult or impossible to prepare a catalyst capable of supporting a metal in a high amount of about 60 wt % or more.

The above information disclosed in this Background section is provided only to enhance understanding of the background of the disclosed embodiments and therefore it may contain information that does not form the prior art that is already known to a person of ordinary skill in the art.

SUMMARY OF THE DISCLOSURE

The disclosed embodiments are presented in an effort to solve the above-described problems associated with the prior art.

It is one object of the present disclosure to provide a method of preparing a multi-component alloy catalyst containing three or more components capable of increasing the amount of metal supported thereon and solving process complexity.

It is another object of the present disclosure to provide a method of preparing a multi-component alloy catalyst capable of reducing the amount of platinum that is used and providing excellent catalytic activity.

The objects of the present disclosure are not limited to those described above. The objects of the present disclosure may be clearly understood from the following description and the claims.

In one aspect, the present disclosure provides a method of preparing a multi-component alloy catalyst. The method includes preparing a carbon composite having a carbon support coated with a cationic polymer, supporting a catalytic metal containing at least two metal elements on the carbon composite to prepare an alloy catalyst precursor and washing the alloy catalyst precursor to remove the cationic polymer.

The method may further include drying a result, free of the cationic polymer, under an inert gas atmosphere, after removal of the cationic polymer.

The cationic polymer may be selected from the group consisting of polyethylenimine (PEI), polyethylenimine ethoxylate (PEIE), poly-L-lysine (PLL) and a combination thereof.

The carbon composite may be prepared by adding the carbon support and the cationic polymer to a solvent at a weight ratio of 1:0.5 to 1:2, followed by stirring.

The catalytic metal may include platinum (Pt), and at least one transition metal selected from the group consisting of copper (Cu), iron (Fe), nickel (Ni), cobalt (Co), manganese (Mn), chromium (Cr), and a combination thereof.

The catalytic metal may include platinum (Pt), copper (Cu), and at least one transition metal selected from the group consisting of iron (Fe), nickel (Ni), cobalt (Co), manganese (Mn), chromium (Cr) and a combination thereof.

Preparing the alloy catalyst precursor may include adding a transition metal precursor to a dispersion in which the carbon composite is dispersed, adding a platinum precursor to the dispersion containing the transition metal precursor, and reacting the dispersion containing the platinum precursor.

The reaction may be carried out at a temperature of 150 to 250° C. for 10 to 20 hours.

The alloy catalyst precursor may be washed with 60° C. to 70° C. distilled water to remove the cationic polymer.

The multi-component alloy catalyst may support the catalytic metal in an amount of 60% by weight or more.

In another aspect, the present disclosure provides a method of manufacturing a membrane-electrode assembly. The method includes preparing a multi-component alloy catalyst, coating release paper with the multi-component alloy catalyst to produce a catalyst layer, and transferring the catalyst layer to an electrolyte membrane. The method of preparing the multi-component alloy catalyst may be accomplished by the method disclosed and described herein.

Other aspects and embodiments of the disclosure are discussed herein.

BRIEF DESCRIPTION OF THE DRAWINGS

The above and other features of the present disclosure are described in detail with reference to certain embodiments thereof illustrated in the accompanying drawings, which are given herein by way of illustration only, and thus are not limitative of the present disclosure, and wherein.

DETAILED DESCRIPTION

Figure 1:
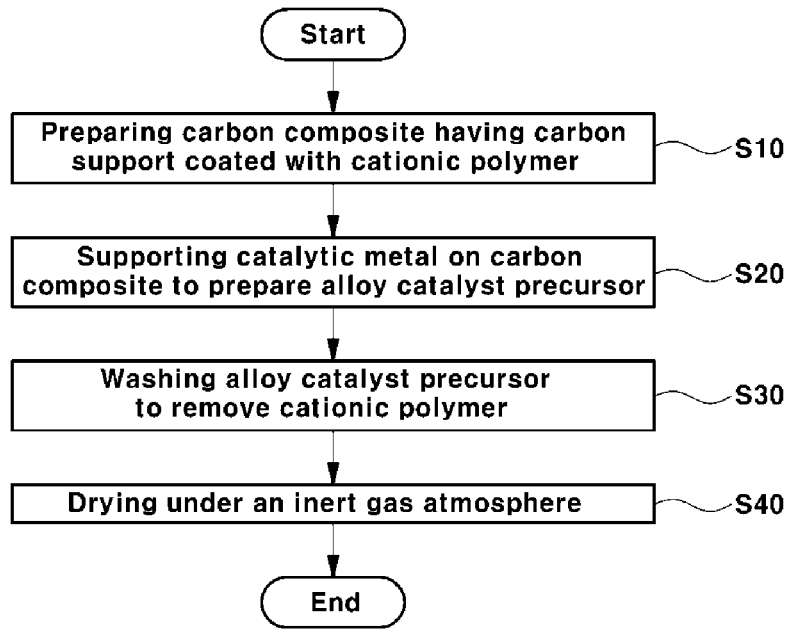
FIG. 1 is a flowchart illustrating a method of preparing a multi-component alloy catalyst according to the present disclosure.

The objects described above, and other objects, features and advantages should be clearly understood from the following embodiments with reference to the attached drawings. However, the present disclosure is not limited to the embodiments and may be embodied in different forms. The embodiments are disclosed only to offer thorough and complete understanding of the disclosed context and sufficiently inform persons of ordinary skill in the art of the technical concept of the present disclosure.

Like numbers refer to like elements throughout the description of the figures. In the drawings, the sizes of structures are exaggerated for clarity. It should be understood that, although the terms "first", "second", etc. may be used herein to describe various elements, these elements should not be construed to be limited by these terms, which are used only to distinguish one element from another. For example, within the scope defined by the present disclosure, a "first" element may be referred to as a "second" element, and similarly, the "second" element may be referred to as the "first" element. Singular forms are intended to include plural forms as well, unless the context clearly indicates otherwise.

It should be further understood that the terms "comprises" and/or "has" when used in this specification, specify the presence of stated features, integers, acts, operations, elements, components or combinations thereof, but do not preclude the presence or addition of one or more other features, integers, steps, operations, elements, components, or combinations thereof. In addition, it should be understood that when an element such as a layer, film, region or substrate is referred to as being "on" another element, it may be directly on the other element, or an intervening element may also be present. It should also be understood that when an element such as a layer, film, region or substrate is referred to as being "under" another element, it may be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numerical ranges are disclosed in the description, these ranges are continuous and include all numbers from the minimum to the maximum including the maximum within each range unless otherwise defined. Furthermore, when the range refers to an integer, it includes all integers from the minimum to the maximum including the maximum within the range, unless otherwise defined.

FIG. 1 is a flowchart illustrating a method of preparing a multi-component alloy catalyst according to the present disclosure. Referring to FIG. 1, the method may include the act S10 of preparing a carbon composite having a carbon support coated with a cationic polymer, the act or step S20 of supporting a catalytic metal containing two or more metal elements on the carbon composite to prepare an alloy catalyst precursor, the act S30 of washing the alloy catalyst precursor to remove the cationic polymer, and the act S40 of drying the result free of the cationic polymer, under an inert gas atmosphere.

The term "multi-component alloy catalyst" used herein means a catalyst in which a catalytic metal containing an alloy of two or more metal elements is supported on a support.

The act S10 of preparing the carbon composite may include injecting a carbon support and a cationic polymer into a solvent, followed by stirring, to coat the carbon support with the cationic polymer.

Figure 2:
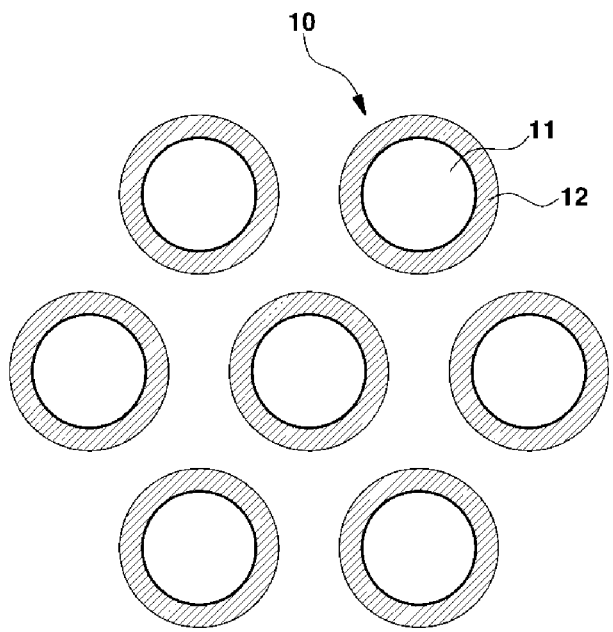
FIG. 2 schematically shows a carbon composite.

FIG. 2 schematically shows the carbon composite 10. Referring to FIG. 1, the carbon composite 10 may include a carbon support 11 and a cationic polymer 12 coated on the carbon support 11.

Any carbon support 11 known to a person of ordinary skill in the art may be used as the carbon support 11 without limitation.

Figure 3:
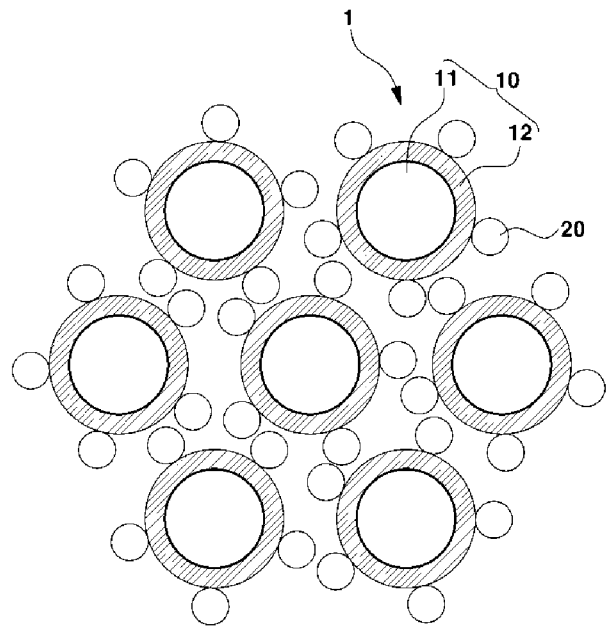
FIG. 3 schematically shows a carbon catalyst precursor.
Figure 4:
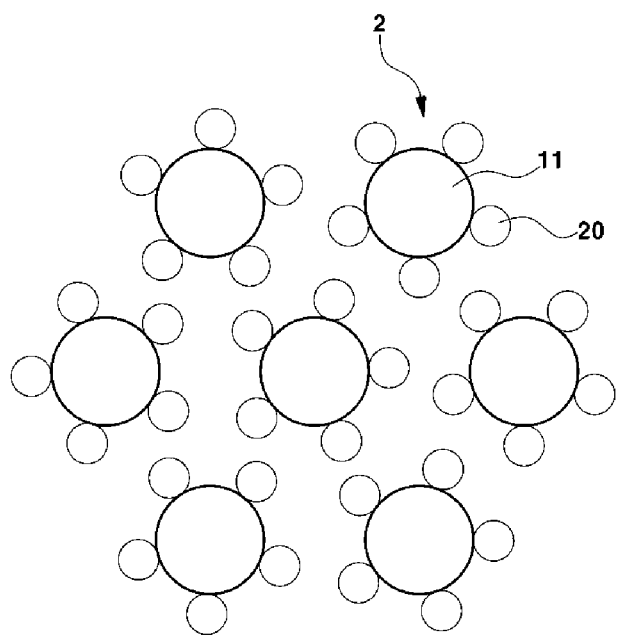
FIG. 4 shows the multi-component alloy catalyst.

The average particle diameter, specific surface area and shape of the carbon support 11 may fall within the ordinary scope known to a person of ordinary skill in the art to which the present disclosure pertains. FIGS. 2-4 illustrate the carbon support 11 in the form of a particle, but the shape of the carbon support 11 is not limited thereto.

The carbon support 11 may be pretreated with an acid, an alkali or the like, and may be surface-modified by oxygen plasma treatment or the like.

The term "cationic polymer" used herein means a polymer having a cationic functional group in a main or side chain thereof.

In some cases, the cationic polymer 12 may include any one selected from the group consisting of polyethylenimine (PEI), polyethylenimine ethoxylate (PEIE), poly-L-lysine (PLL) and a combination thereof.

The cationic polymer 12 may be coated on the entirety or a part of the surface of the carbon support 11. FIGS. 2 and 3 illustrate that the cationic polymer 12 is coated over the entire surface of the carbon support 11, but the present disclosure is not limited thereto.

The carbon composite 10 may be prepared by adding the carbon support 11 and the cationic polymer 12 to a solvent at a weight ratio of 1:0.5 to 1:2, followed by stirring. When the weight ratio of the cationic polymer 12 to the carbon support 11 is less than 0.5, the cationic polymer 12 may be not sufficiently coated on the surface of the carbon support 11 and the effect of increasing the amount of supported catalytic metal may be insufficient, and when the weight ratio exceeds 2, it may be difficult to remove the cationic polymer 12 in the subsequent step or act.

The solvent may be an alcohol, such as for example, isopropanol, but is not limited thereto.

The carbon composite 10 may be prepared by stirring under appropriate time, temperature, and speed conditions. However, the stirring conditions for the carbon support 11 and the cationic polymer 12 are not limited thereto.

The step or act S20 of supporting a catalytic metal containing two or more metal elements on the carbon composite 10 to prepare an alloy catalyst precursor may include adding a catalytic metal precursor to a dispersion, in which the carbon composite 10 is dispersed, and may include reacting the ingredients under particular conditions to prepare an alloy catalyst precursor.

FIG. 3 schematically shows a carbon catalyst precursor 1. Referring to FIG. 3, the carbon catalyst precursor 1 may include a carbon composite 10 containing a carbon support 11 and a cationic polymer 12, and a catalytic metal supported on the carbon composite 10.

The catalytic metal 20 may include two or more metal elements and may be an alloy of platinum (Pt) and a transition metal. The catalytic metal 20 may be a two-component system, a three-component system, a four-component system, or a system with more components.

In some cases, the catalytic metal 20 may include platinum (Pt) and at least one transition metal selected from the group consisting of copper (Cu), iron (Fe), nickel (Ni), cobalt (Co), manganese (Mn), chromium (Cr) and a combination thereof.

In some other cases, the catalytic metal 20 may include: platinum (Pt); copper (Cu); and at least one transition metal selected from the group consisting of iron (Fe), nickel (Ni), cobalt (Co), manganese (Mn), chromium (Cr) and a combination thereof.

In some cases, the catalytic metal 20 may be Pt—Cu—Fe or Pt—Cu—Ni.

The step or act S20 of preparing the alloy catalyst precursor 1 may include adding a transition metal precursor to a dispersion, in which the carbon composite 10 is dispersed, adding a platinum precursor to a dispersion containing the transition metal precursor, and reacting the resulting dispersion.

When the number of transition metals to be alloyed with platinum is two or more, two or more transition metal precursors may be added simultaneously or separately. In some cases, the transition metal precursors are added separately. For example, after one transition metal precursor is added and then stirred, the other transition metal precursor may be added and stirred.

As to the types of the transition metal precursor and the platinum precursor, any precursors known to a person of ordinary skill in the art, to which the present disclosure pertains, for example, metal acetylacetonate, may be used without limitation.

The amount of the transition metal precursor that is added, the amount of the platinum precursor that is added, and the weight ratio of the transition metal precursor to the platinum precursor are not particularly limited. For example, the transition metal precursor and the platinum precursor may be added in excessive amounts in order to maximize the amount of the catalytic metal 20 that is supported.

The alloy catalyst precursor 1 may be prepared by adding the transition metal precursor and the platinum precursor to the dispersion and then reacting the dispersion in a high-pressure and high-temperature reactor at a temperature of 150 to 250° C. and a stirring speed of 300 to 400 RPM for a reaction time of 10 to 20 hours.

Then, as described with respect to act S30, the alloy catalyst precursor 1 is washed to remove the cationic polymer 12, thereby obtaining a multi-component alloy catalyst 2. FIG. 4 shows the multi-component alloy catalyst 2.

The alloy catalyst precursor 1 may be washed with distilled water at 60° C. to 70° C. using a filter and filtered to remove the cationic polymer 12. The number of times of washing is not particularly limited and may be suitably controlled.

As the cationic polymer 12 is removed, a multi-component alloy catalyst 2 in which the catalytic metal 20 is supported on the carbon support 11 may be obtained.

Then, as described with respect to act S40, the multi-component alloy catalyst 2 may be dried at room temperature under an inert gas atmosphere such as argon gas or nitrogen gas.

The amount of catalytic metal 20 supported on the multi-component alloy catalyst 2 obtained through the above-described method is remarkably improved compared to a conventional multi-component alloy catalyst. For example, the multi-component alloy catalyst 2 may include the catalytic metal 20 in an amount of 60% by weight or more, 60 to 90% by weight, or 60 to 80% by weight, based on the total weight of the carbon support 11 and the catalytic metal 20, that is, the total weight of the catalyst.

The multi-component alloy catalyst 2 prepared by the above-described method may be used as a catalyst layer of a fuel cell. For example, the multi-component alloy catalyst 2 may be coated on release paper to produce a catalyst layer, and the catalyst layer may be transferred to an electrolyte membrane to produce a membrane-electrode assembly.

Hereinafter, the present disclosure may be described in more detail with reference to examples. However, the following examples are provided only for illustration of the present disclosure and should not be construed as limiting the scope of the present disclosure.

EXAMPLE 1

As described with respect to act S10, polyethylenimineethoxylate (PEIE) and a carbon support were added at a weight ratio of 1:1 to isopropanol, followed by stirring. After about 12 hours, the solvent was removed and the result was washed with ethanol and then dried in an oven at about 80° C. for about 12 hours to obtain a carbon composite.

As described with respect to act S20, the carbon composite was added to a mixed solvent of dimethylformamide (DMF) and ethylene glycol (EG) and dispersed using an ultrasonic disperser. Then, potassium hydroxide was added thereto and stirred for 1 hour to obtain a dispersion. A predetermined amount of $Cu(C_5H_7O_2)_2$ (copper acetylacetonate) was added to the dispersion, followed by stirring for about 30 minutes. Then, a predetermined amount of $Fe(C_5H_7O_2)_3$ (iron acetylacetonate) was added thereto, the dispersion was stirred for about 1 hour, and then a predetermined amount of dimethylformamide (DMF) was added thereto. Finally, a solution of $Pt(C_5H_7O_2)_2$ (platinum acetylacetonate) dissolved in a mixed solvent of dimethylformamide (DMF) and ethylene glycol (EG) was added. The mixture was reacted under stirring at about 350 RPM for about 15 hours while maintaining a temperature of about 170° C. in a high-pressure high-temperature reactor to obtain an alloy catalyst precursor.

As described with respect to act S30, the alloy catalyst precursor was washed several times with distilled water at 60 to 70° C. using a Teflon filter to remove polyethylenimine ethoxylate (PEIE) and thereby to obtain a multi-component alloy catalyst including a catalytic metal of Pt—Cu—Fe supported on a carbon support.

As described with respect to act S40, the multi-component alloy catalyst was dried at room temperature under an inert gas atmosphere.

EXAMPLE 2

A multi-component alloy catalyst was prepared in the same manner as in Example 1, except that $Ni(C_5H_7O_2)_3$ (nickel acetylacetonate) was used instead of Fe $(C_5H_7O_2)_3$ (iron acetylacetonate). The multi-component alloy catalyst according to Example 2 included the catalytic metal of Pt—Cu—Ni supported on the carbon support.

COMPARATIVE EXAMPLE 1

A multi-component alloy catalyst was prepared by directly supporting a catalytic metal on a carbon support without coating the carbon support with a cationic polymer. The details of the preparation method are as follows.

The carbon support was added to a mixed solvent of dimethylformamide (DMF) and ethylene glycol (EG) and dispersed therein using an ultrasonic disperser. Potassium hydroxide was then added thereto, and the mixture was stirred for 1 hour to obtain a dispersion. A predetermined amount of $Cu(C_5H_7O_2)_2$ (copper acetylacetonate) was added to the dispersion, followed by stirring for about 30 minutes. Then, a predetermined amount of $Fe(C_5H_7O_2)_3$ (iron acetylacetonate) was added thereto, the dispersion was stirred for about 1 hour, and dimethylformamide (DMF) was added thereto. Finally, a solution of $Pt(C_5H_7O_2)_2$ (platinum acetylacetonate) dissolved in a mixed solvent of dimethylformamide (DMF) and ethylene glycol (EG) was added. The mixture was reacted under stirring in a high-pressure and high-temperature reactor at about 350 RPM for about 15 hours while maintaining a temperature of about 170° C. to obtain a multi-component alloy catalyst including a Pt—Cu—Fe catalytic metal supported on the carbon support.

The multi-component alloy catalyst was dried at room temperature under an inert gas atmosphere.

COMPARATIVE EXAMPLE 2

A multi-component alloy catalyst was prepared in the same manner as in Comparative Example 1, except that $Ni(C_5H_7O_2)_3$ (nickel acetylacetonate) was used instead of $Fe(C_5H_7O_2)_3$ (iron acetylacetonate). The multi-component alloy catalyst according to Comparative Example 2 included the catalytic metal of Pt—Cu—Ni supported on the carbon support.

EXPERIMENTAL EXAMPLE 1

Measurement of Amount of Supported Catalytic Metal

The amounts of catalytic metal supported on the alloy catalyst according to Example 1, Example 2, Comparative Example 1 and Comparative Example 2 were measured through thermal gravimetric analysis (TGA). During the thermal gravimetric analysis, the carbon support was pyrolyzed and removed until the temperature of the catalyst was elevated at a rate of 10° C./min up to 800° C. under an oxygen atmosphere. Finally, only the catalytic metal remained. As a result, it was possible to measure the amount of catalytic metal supported thereon by comparing the amount of remaining catalytic metal with the total amount of initially supported catalytic metal.

Figure 5A:
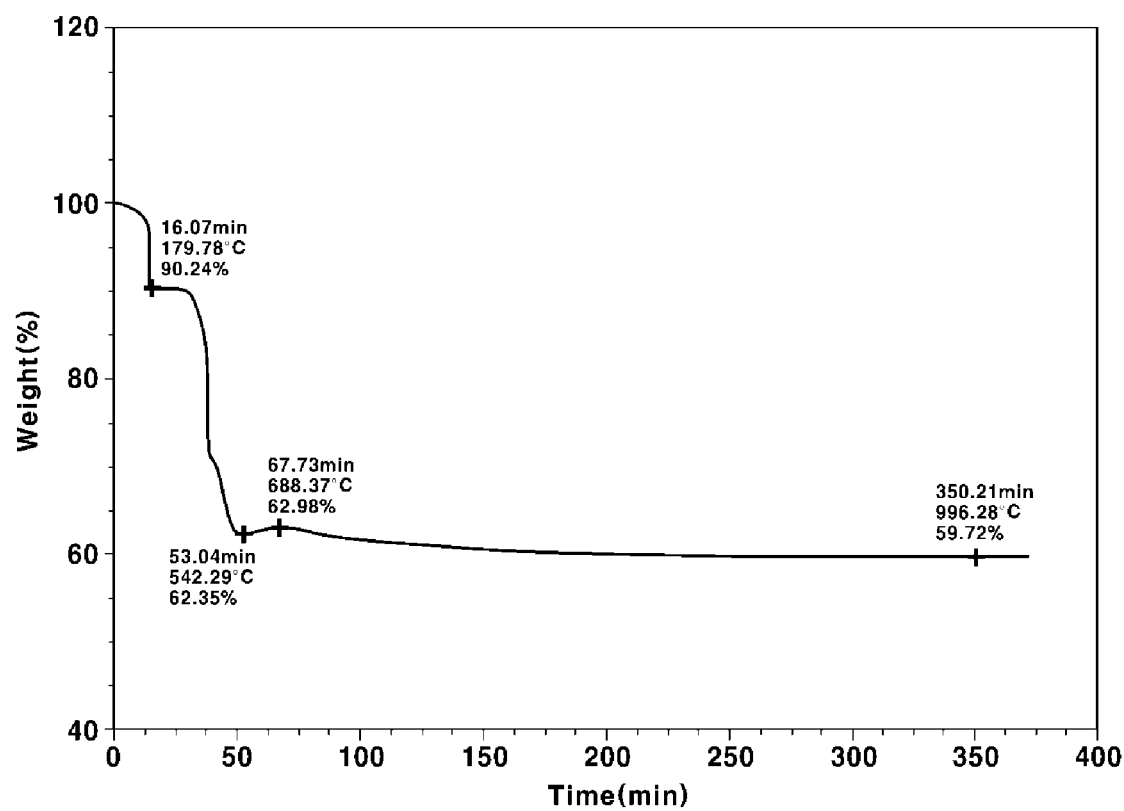
FIG. 5A shows the results of measurement of the amount of catalytic metal supported on the alloy catalyst in Example 1.
Figure 5B:
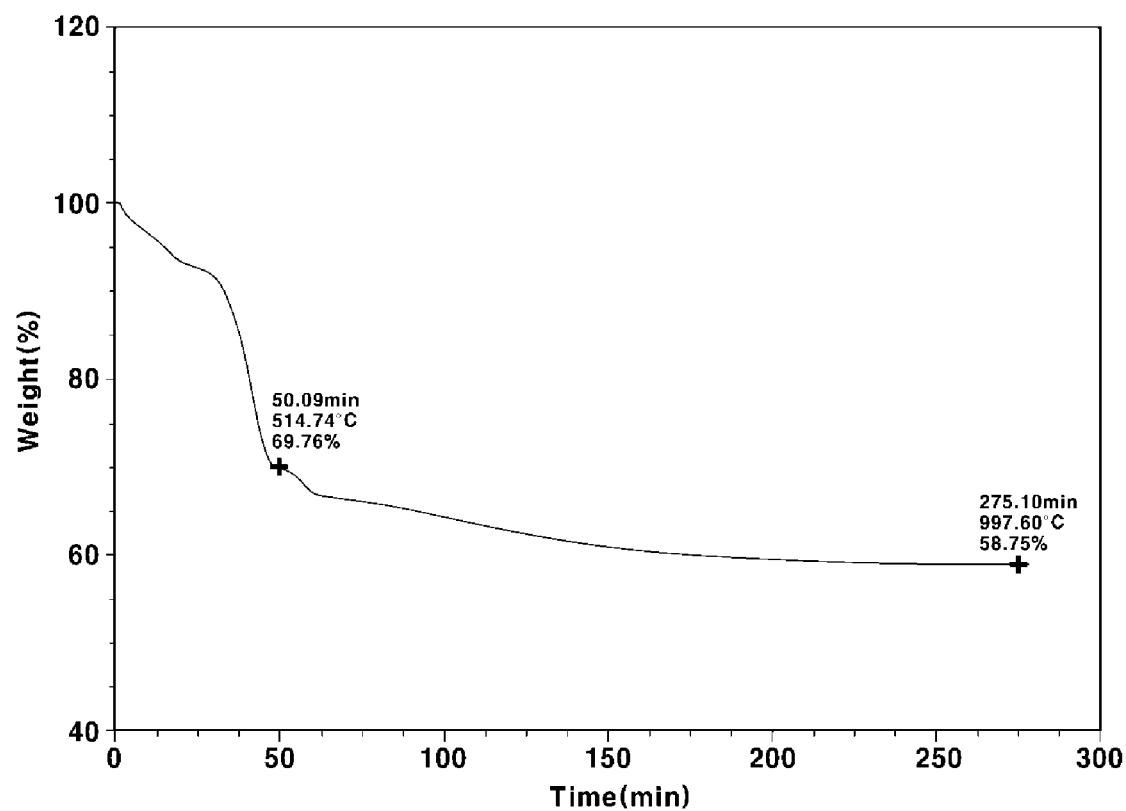
FIG. 5B shows the results of measurement of the amount of catalytic metal supported on the alloy catalyst in Example 2.
Figure 5C:
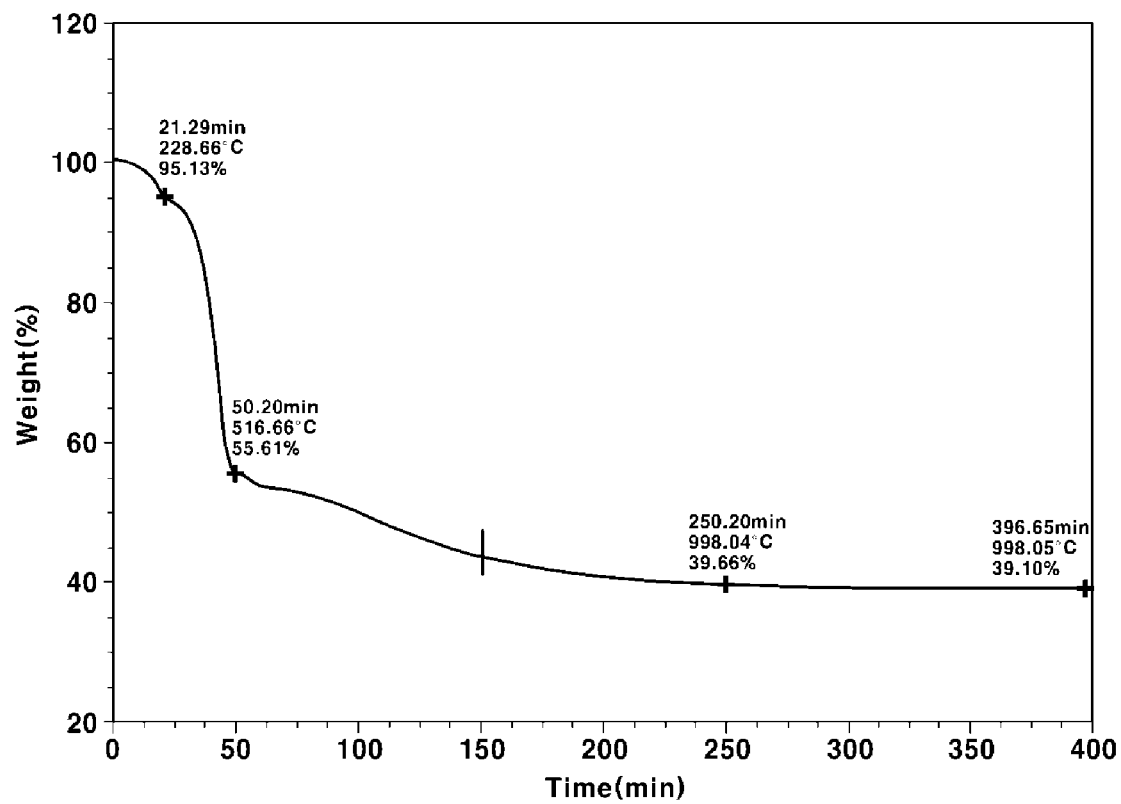
FIG. 5C shows the results of measurement of the amount of catalytic metal supported on the alloy catalyst in Comparative Example 1.
Figure 5D:
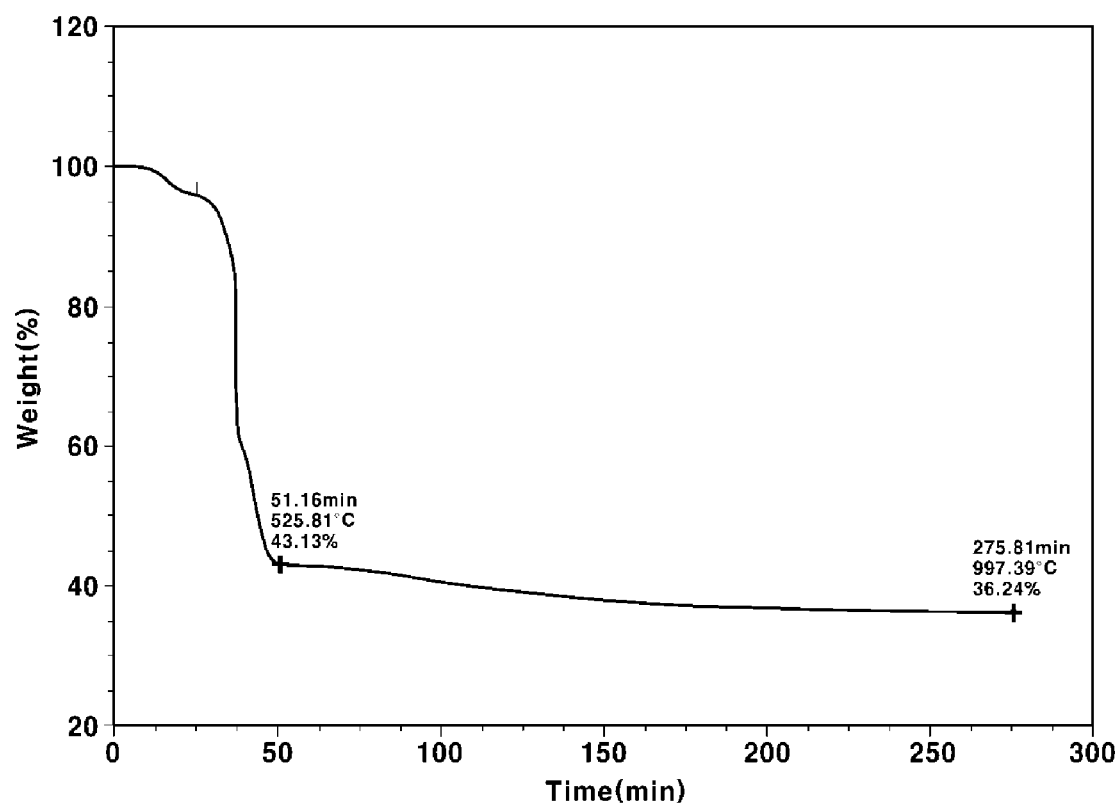
FIG. 5D shows the results of measurement of the amount of catalytic metal supported on the alloy catalyst in Comparative Example 2.

The results are shown in FIGS. 5A-5D. For example, FIG. 5A shows the results of measurement of the amount of catalytic metal loaded on the alloy catalyst in Example 1, FIG. 5B shows the results of measurement of the amount of catalytic metal supported on the alloy catalyst in Example 2, FIG. 5C shows the results of measurement of the amount of catalytic metal supported on the alloy catalyst in Comparative Example 1, and FIG. 5D shows the results of measurement of the amount of catalytic metal supported on the alloy catalyst in Comparative Example 2.

As may be seen from FIG. 5A, regarding the multi-component alloy catalyst of Example 1 according to the present disclosure, the amount of supported Pt—Cu—Fe was about 60% by weight. On the other hand, regarding the multi-component alloy catalyst of Comparative Example 1, which was prepared without using the cationic polymer, the amount of supported Pt—Cu—Fe was only about 39% by weight.

Meanwhile, as may be seen from FIG. 5C, the amount of Pt—Cu—Ni supported on the multi-component alloy catalyst of Example 2 according to the present disclosure was about 60% by weight. On the other hand, the amount of Pt—Cu—Ni supported on the multi-component alloy catalyst of Comparative Example 2, which was prepared without using the cationic polymer, was only about 36 wt %.

These results showed that the amount of the catalytic metal supported on the multi-component alloy catalyst obtained by the preparation method according to the present disclosure has increased to a level that has not been possible in the prior art.

EXPERIMENTAL EXAMPLE 2

Transmission Electron Microscopy (TEM) Analysis

Figure 6A:
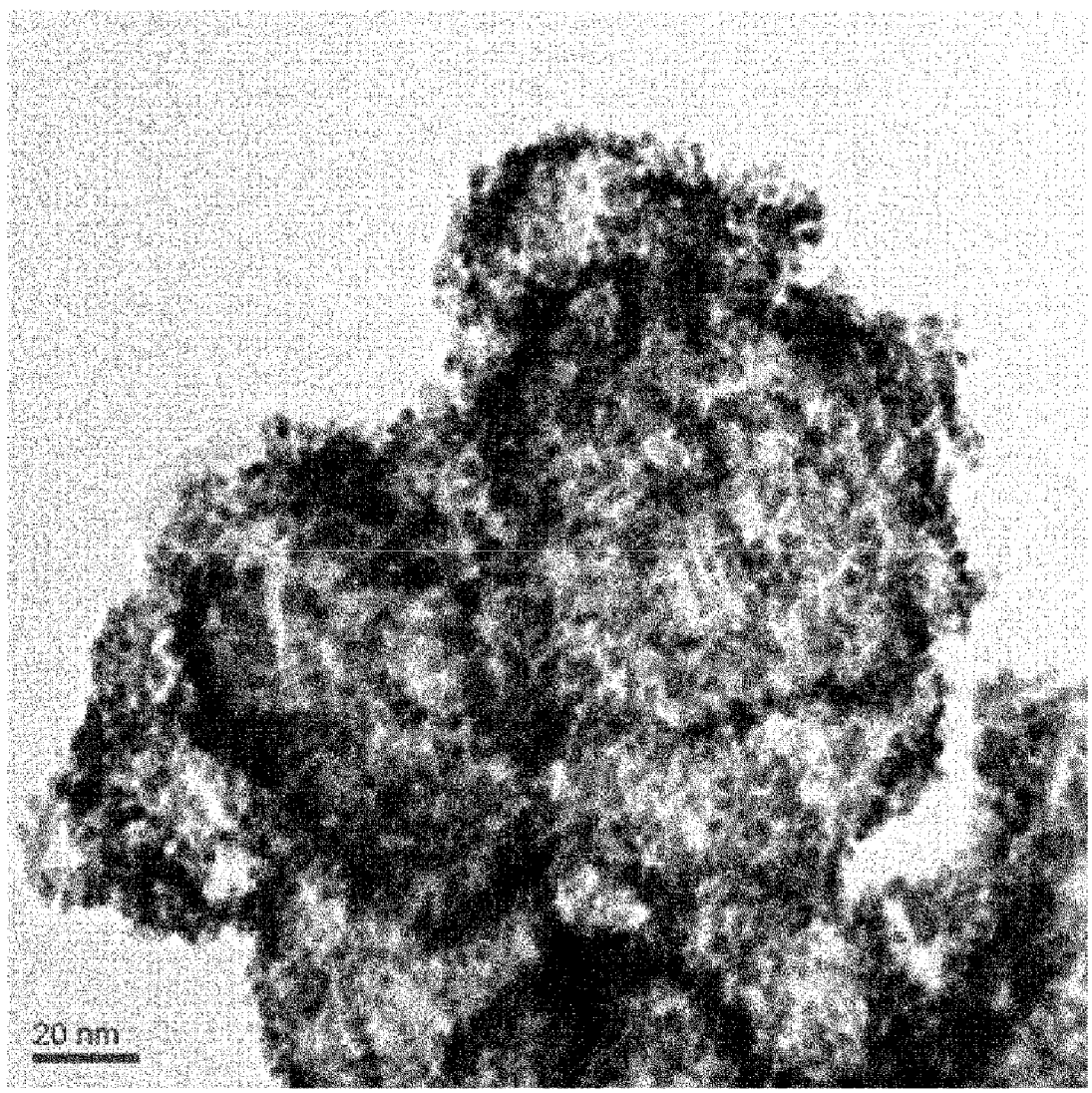
FIG. 6A shows a transmission electron microscope (TEM) analysis result of the alloy catalyst according to Example 1.
Figure 6B:
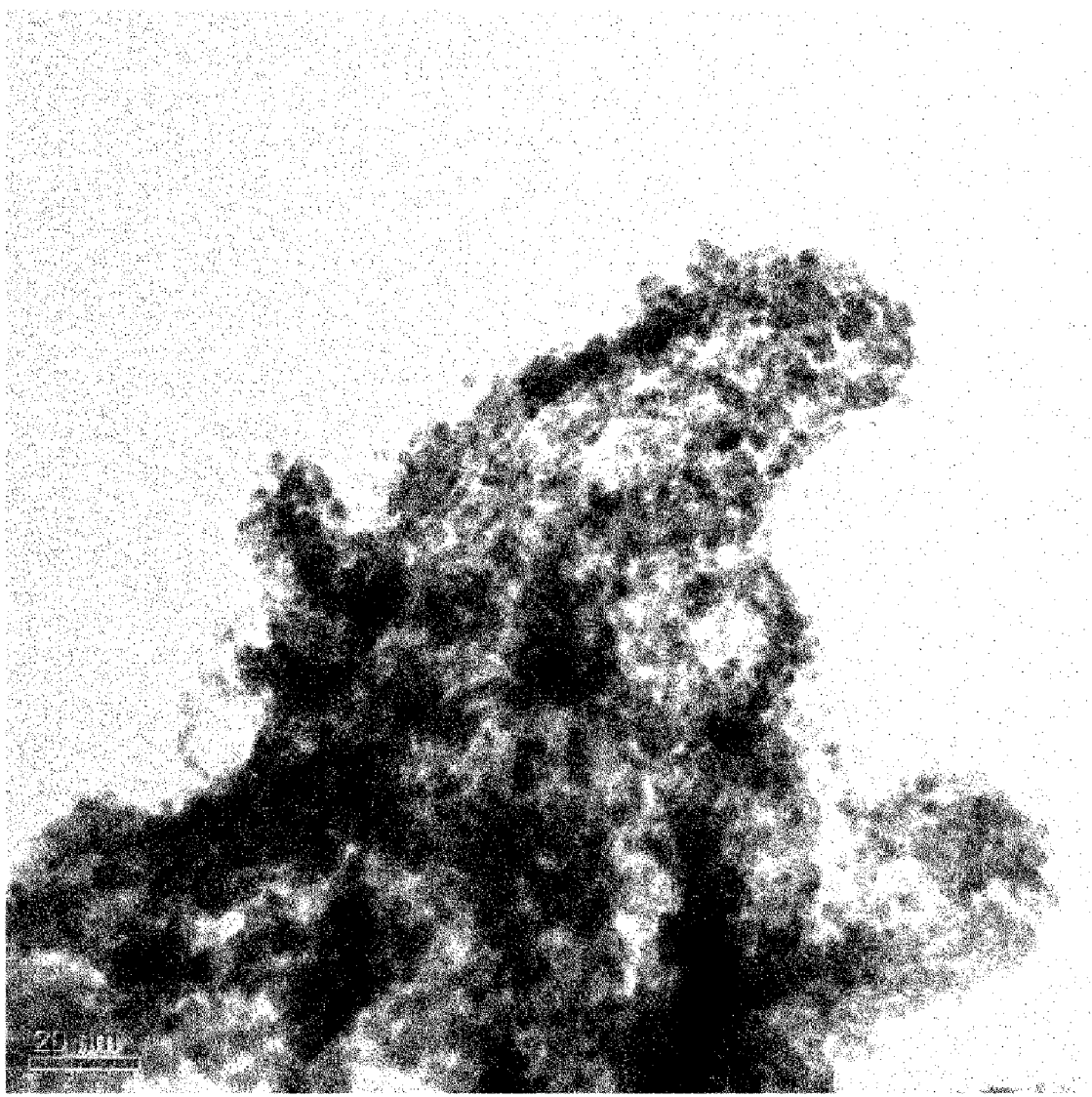
FIG. 6B shows a transmission electron microscope (TEM) analysis result of the alloy catalyst according to Example 2.
Figure 6C:
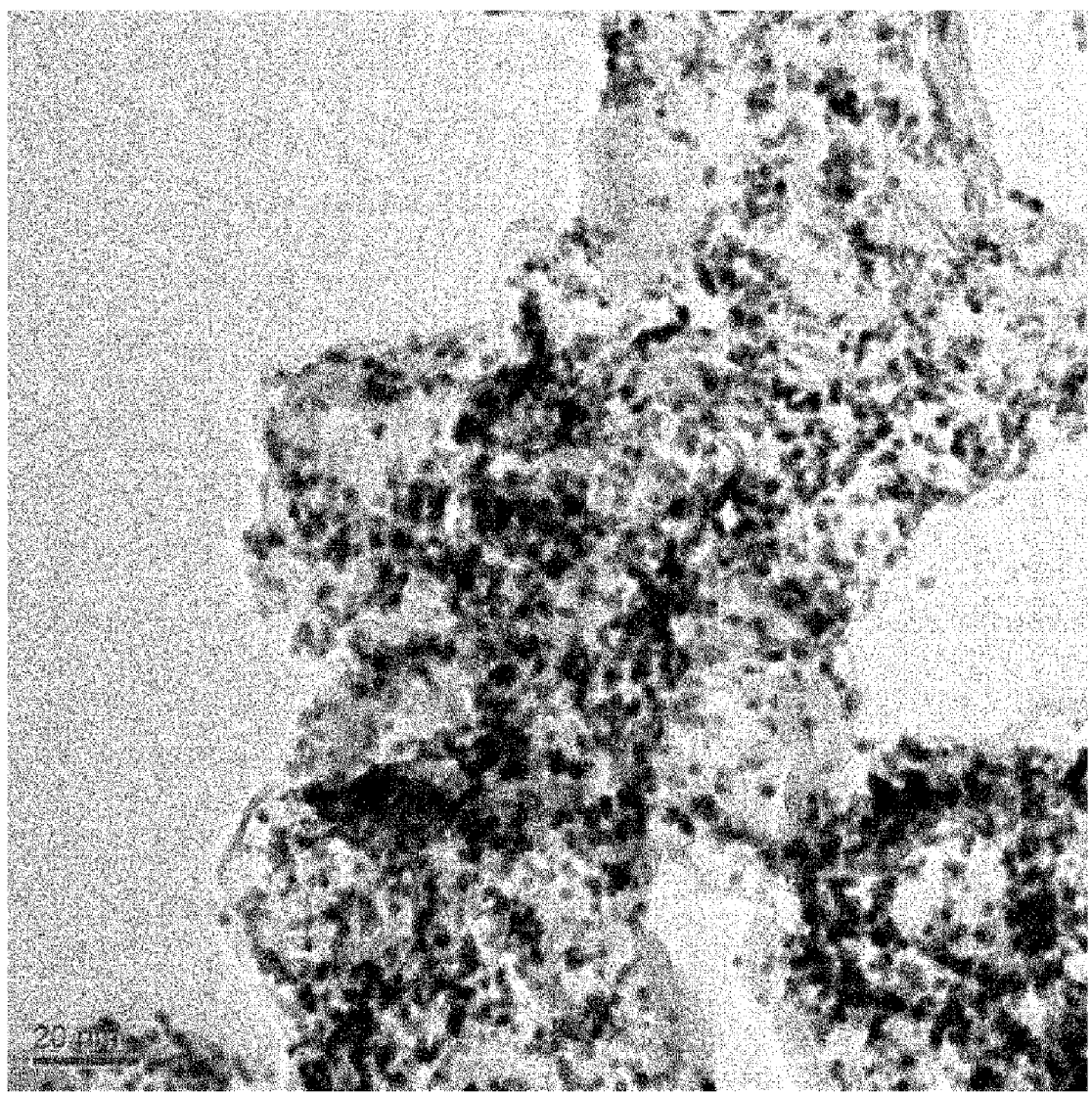
FIG. 6C shows a transmission electron microscope (TEM) analysis result of the alloy catalyst according to Comparative Example 1.
Figure 6D:
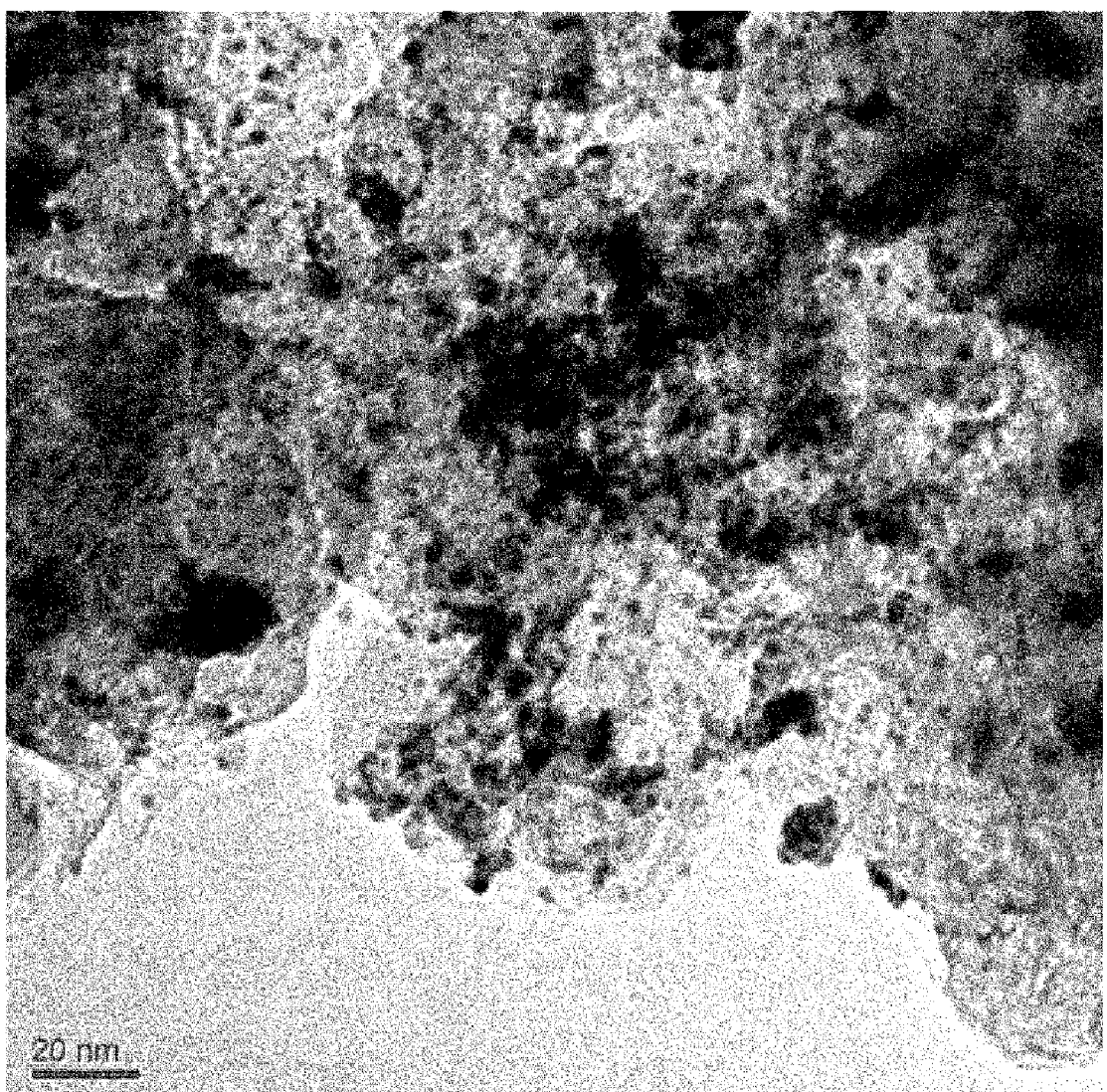
FIG. 6D shows a transmission electron microscope (TEM) analysis result of the alloy catalyst according to Comparative Example 2.

Transmission electron microscopic (TEM) analysis of the alloy catalysts according to Example 1, Example 2, Comparative Example 1 and Comparative Example 2 was performed. The results are shown in FIGS. 6A to 6D. FIG. 6A shows a transmission electron microscope (TEM) analysis result of the alloy catalyst according to Example 1, FIG. 6B shows a transmission electron microscope (TEM) analysis result of the alloy catalyst according to Example 2, FIG. 6C shows a transmission electron microscope (TEM) analysis result of the alloy catalyst according to Comparative Example 1, and FIG. 6D shows a transmission electron microscope (TEM) analysis result of the alloy catalyst according to Comparative Example 2.

Comparing FIG. 6A with FIG. 6C, it may be seen that the amount of the catalytic metal supported on the multi-component alloy catalyst according to Example 1 is significantly greater than that of Comparative Example 1.

Similarly, comparing FIG. 6B with FIG. 6D, it may be seen that the amount of catalytic metal supported on the multi-component alloy catalyst according to Example 2 is significantly greater than that of Comparative Example 2.

EXPERIMENTAL EXAMPLE 3

Evaluation of Electrochemical Characteristics

In order to evaluate the electrochemical oxygen reduction reaction (ORR) activity and the electrochemical surface area (ECSA), the polarization curve and the electrochemical surface area for the oxygen reduction reaction were obtained using a rotation disk electrode (RDE).

The area of the rotation disk electrode was 19.6 mm2 and the method of loading the synthesized catalyst on the electrode surface is as follows.

A powder-type catalyst was dispersed in alcohol, an ionomer was added thereto to prepare a catalytic ink, and then a predetermined amount of the catalytic ink was dropped on a rotary disk electrode and dried to evaporate the alcohol. Thus, only the film-type catalyst remained on the rotary disk electrode.

The electrochemical characteristics were evaluated using a three-electrode system. An SCE electrode was used as a reference electrode and a platinum wire was used as a counter electrode. All analysis was carried out at room temperature.

The experimental conditions for obtaining the ORR polarization curve are as follows. The electrolyte solution was saturated with oxygen and then oxygen was continuously supplied during the analysis. The scan speed was 5 mV/sec and the range of the scan speed was 0.05 to 1.0 V (vs. RHE). Finally, the rotation speed of the electrode was maintained at 1600 RPM.

Figure 7A:
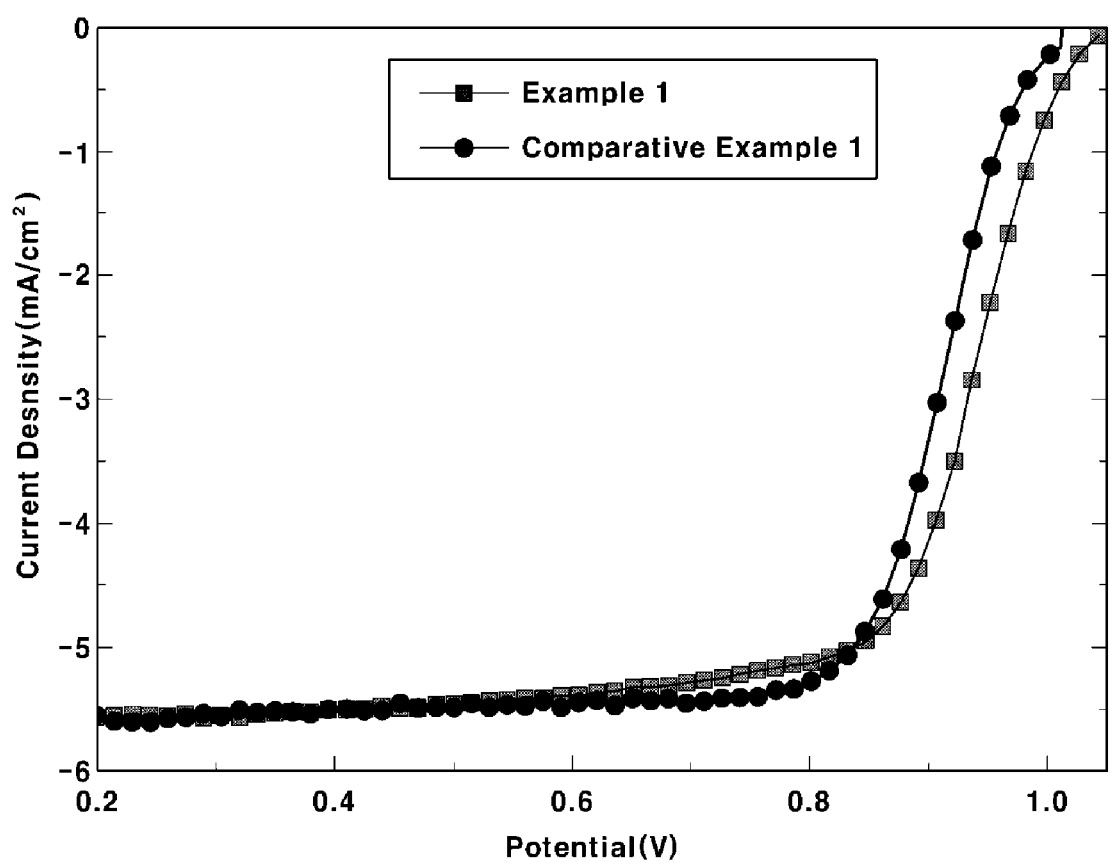
FIG. 7A shows results of measurement of the polarization curve of oxygen reduction reaction (ORR) in Example 1 and Comparative Example 1.
Figure 7B:
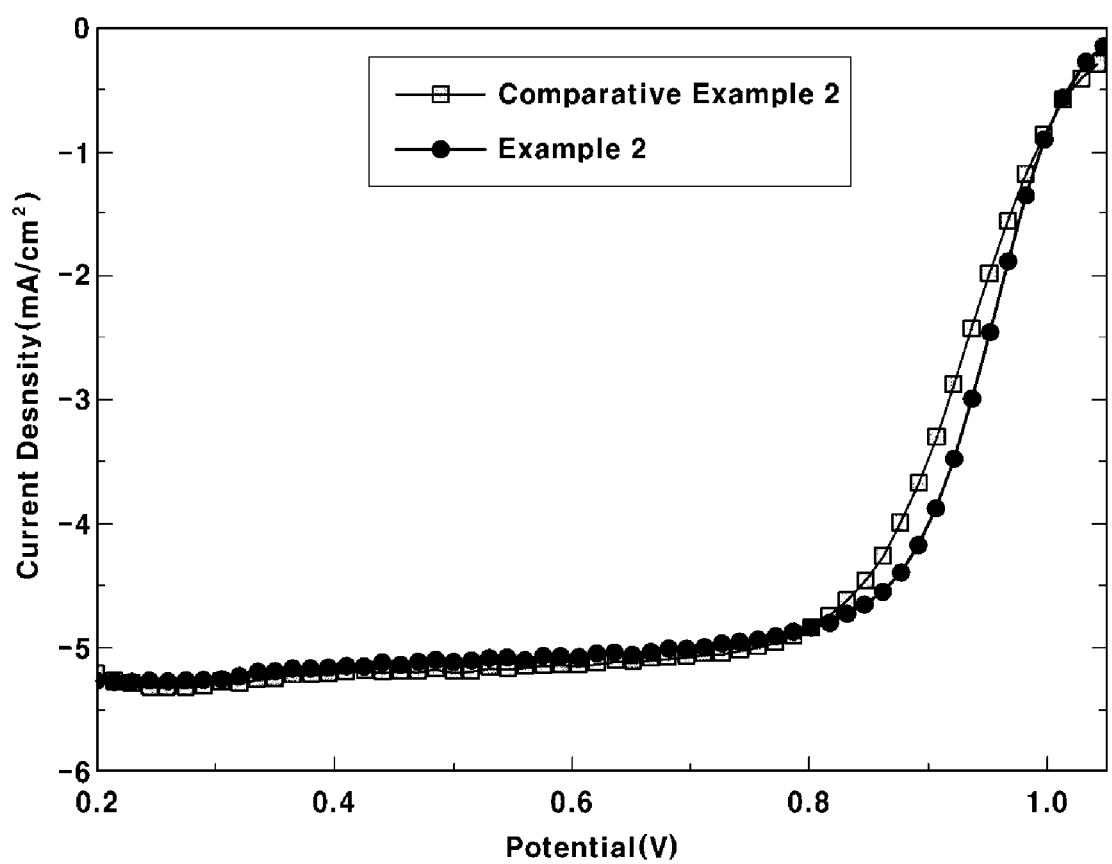
FIG. 7B shows results of measurement of the polarization curve of electrochemical oxygen reduction reaction (ORR) for Example 2 and Comparative Example 2.

The results are shown in FIGS. 7A and 7B. FIG. 7A shows results for Example 1 and Comparative Example 1, and FIG. 7B shows results for Example 2 and Comparative Example 2. As the half-wave potential of the polarization curve increases, the activity for the oxygen reduction reaction increases. The half-wave potential value was about 0.94V in Examples 1 and 2 and was about 0.90V in Comparative Examples 1 and 2. Therefore, it may be seen that the activities for oxygen reduction reaction of Examples 1 and 2 according to the present disclosure were superior to those of Comparative Examples 1 and 2.

Figure 8A:
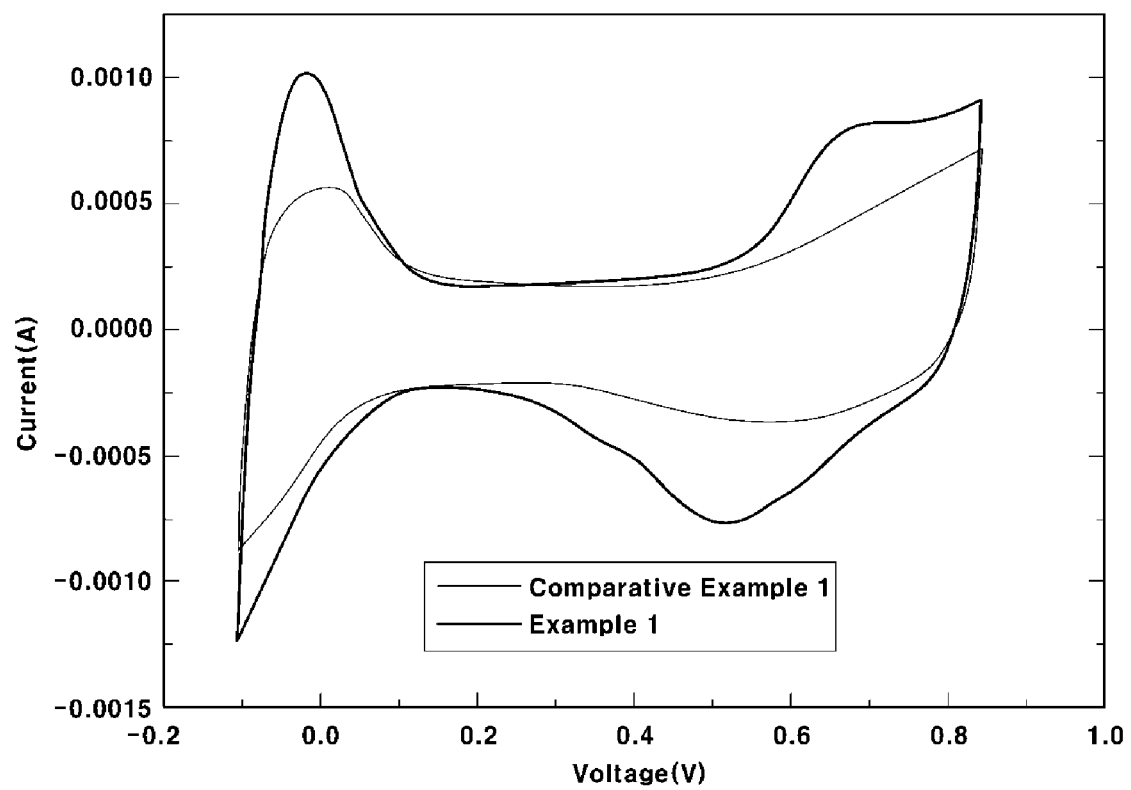
FIG. 8A shows electrochemical surface areas in Example 1 and Comparative Example 1.
Figure 8B:
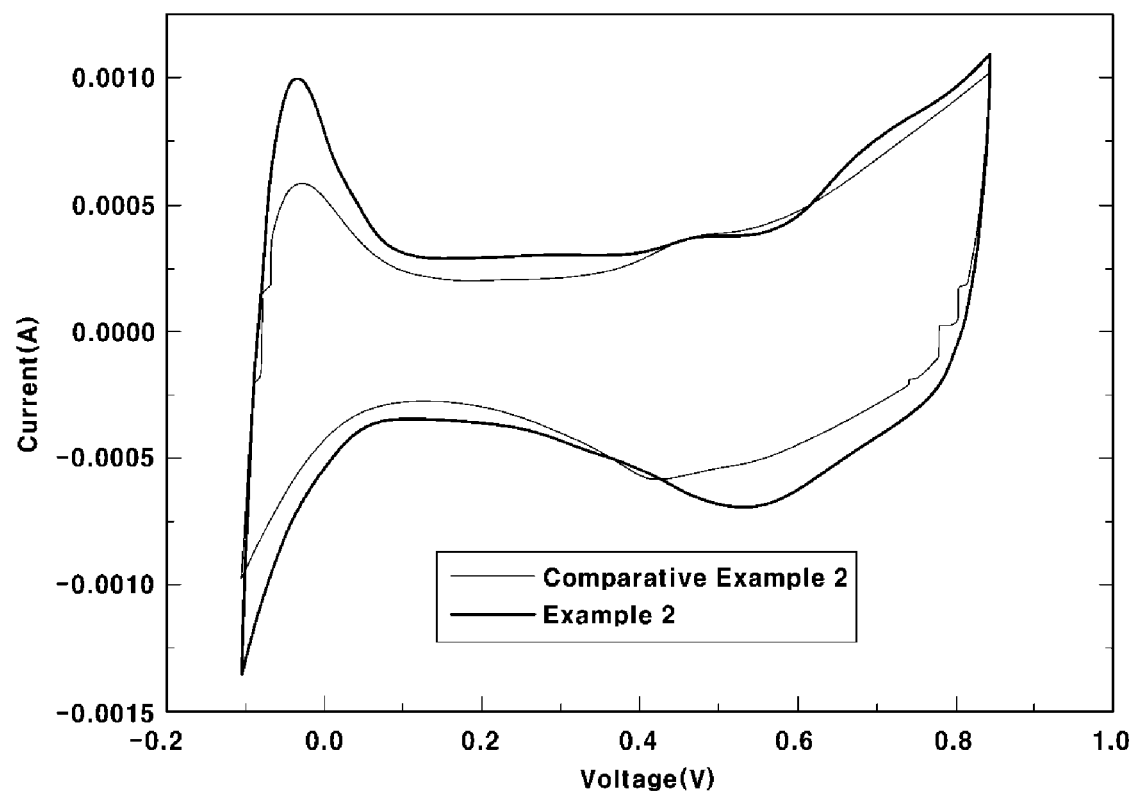
FIG. 8B shows electrochemical surface areas in Example 2 and Comparative Example 2.

FIG. 8A shows electrochemical surface areas for Example 1 and Comparative Example 1, and FIG. 8B shows electrochemical surface areas for Example 2 and Comparative Example 2. Referring to these drawings, Example 1 and Example 2 show greater electrochemical surface areas than those of Comparative Example 1 and Comparative Example 2, respectively. This indicates that the multi-component alloy catalyst according to Examples 1 and 2 has an increased electrochemical surface area compared to Comparative Examples 1 and 2.

As apparent from the foregoing, according to the method of preparing a multi-component alloy catalyst according to the present disclosure, it is possible to obtain an alloy catalyst supporting a much greater amount of a catalytic metal than a conventional multi-component alloy catalyst.

According to the method of preparing a multi-component alloy catalyst according to the present disclosure, it is possible to obtain an alloy catalyst in a considerably simplified manner compared to a conventional preparation method.

According to the method of preparing a multi-component alloy catalyst so according to the present disclosure, it is possible to obtain an alloy catalyst having improved catalytic activity while reducing the amount of platinum used.

The effects of the present disclosure are not limited to those described above. It should be understood that the effects of the embodiments of the present disclosure include all effects that may be inferred from the description above.

The disclosure includes multiple embodiments described in detail. However, it should be appreciated by those of ordinary skill in the art that changes may be made in these embodiments without departing from the principles and spirit of the disclosure, the scope of which is defined in the appended claims and their equivalents.

What is claimed is:

1. A method of preparing a multi-component alloy catalyst, the method comprising:
    preparing a carbon composite having a carbon support coated with a cationic polymer;
    supporting a catalytic metal containing at least two metal elements on the carbon composite to prepare an alloy catalyst precursor; and
    washing the alloy catalyst precursor to remove the cationic polymer.

2. The method according to claim 1, further comprising drying a result, free of the cationic polymer, under an inert gas atmosphere, after removal of the cationic polymer.

3. The method according to claim 1, wherein the cationic polymer is selected from the group consisting of polyethylenimine (PEI), polyethylenimine ethoxylate (PEIE), poly-L-lysine (PLL) and a combination thereof.

4. The method according to claim 1, wherein the carbon composite is prepared by adding the carbon support and the cationic polymer to a solvent at a weight ratio of 1:0.5 to 1:2, followed by stirring.

5. The method according to claim 1, wherein the catalytic metal comprises:
    platinum (Pt); and
    at least one transition metal selected from the group consisting of copper (Cu), iron (Fe), nickel (Ni), cobalt (Co), manganese (Mn), chromium (Cr) and a combination thereof.

6. The method according to claim 1, wherein the catalytic metal comprises:
    platinum (Pt);
    copper (Cu); and
    at least one transition metal selected from the group consisting of iron (Fe), nickel (Ni), cobalt (Co), manganese (Mn), chromium (Cr) and a combination thereof.

7. The method according to claim 1, wherein the preparing the alloy catalyst precursor comprises:
    adding a transition metal precursor to a dispersion in which the carbon composite is dispersed;
    adding a platinum precursor to the dispersion containing the transition metal precursor; and
    reacting the dispersion containing the platinum precursor.

8. The method according to claim 7, wherein the reaction is carried out at a temperature of 150 to 250° C. for 10 to 20 hours.

9. The method according to claim 1, wherein the alloy catalyst precursor is washed with 60° C. to 70° C. distilled water to remove the cationic polymer.

10. The method according to claim 1, wherein the multi-component alloy catalyst supports the catalytic metal in an amount of 60% by weight or more.

11. A method of manufacturing a membrane-electrode assembly, the method comprising:
   preparing a multi-component alloy catalyst by the method according to claim 1;
   coating release paper with the multi-component alloy catalyst to produce a catalyst layer; and
   transferring the catalyst layer to an electrolyte membrane.

* * * * *